United States Patent
Oh et al.

(10) Patent No.: US 8,797,424 B2
(45) Date of Patent: Aug. 5, 2014

(54) IMAGE PROCESSING APPARATUS FOR READING COMPRESSED DATA FROM MEMORY VIA DATA BUS AND IMAGE PROCESSING METHOD PERFORMED IN THE IMAGE PROCESSING APPARATUS

(75) Inventors: Sang Do Oh, Yongin-si (KR); Jae Young Lee, Hwaseong-si (KR); Jung Hyun Lim, Suwon-si (KR); Hong Jun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 12/915,541

(22) Filed: Oct. 29, 2010

(65) Prior Publication Data
US 2011/0149147 A1    Jun. 23, 2011

(30) Foreign Application Priority Data
Dec. 21, 2009  (KR) .................. 10-2009-0128287

(51) Int. Cl.
*H04N 5/76*  (2006.01)

(52) U.S. Cl.
USPC ..................................... 348/231.2

(58) Field of Classification Search
USPC ....................................... 348/231.2
See application file for complete search history.

(56) References Cited

U.S. PATENT DOCUMENTS

| | | | |
|---|---|---|---|
| 2004/0091160 A1* | 5/2004 | Hook et al. | 382/239 |
| 2008/0056381 A1* | 3/2008 | Sung et al. | 375/240.26 |
| 2008/0205869 A1* | 8/2008 | Nose | 396/77 |

FOREIGN PATENT DOCUMENTS

| | | | |
|---|---|---|---|
| JP | 2005311743 A | 11/2005 |
| JP | 2008292542 A | 12/2008 |
| KR | 1020050074041 A | 7/2005 |
| KR | 1020080103034 A | 11/2008 |

\* cited by examiner

*Primary Examiner* — Usman Khan
(74) *Attorney, Agent, or Firm* — Sughrue Mion, PLLC (57) ABSTRACT

An image processing apparatus including a memory, a data bus provided to access the memory, an image conversion unit which receives an image signal and converts the image signal into a frame comprising a plurality of lines, and an image compression/decompression unit which divides the frame into a plurality of line groups, compresses each of the plurality of line groups to generate compressed data, and stores the compressed data in the memory via the data bus, where at least one line in at least one line group is omitted from the compression.

14 Claims, 5 Drawing Sheets

IMAGE PROCESSING APPARATUS FOR READING COMPRESSED DATA FROM MEMORY VIA DATA BUS AND IMAGE PROCESSING METHOD PERFORMED IN THE IMAGE PROCESSING APPARATUS

CROSS-REFERENCE TO RELATED APPLICATIONS

This application claims priority under 35 U.S.C. §119 to Korean Patent Application No. 10-2009-0128287, filed on Dec. 21, 2009, in the Korean Intellectual Property Office (KIPO), the entire contents of which are incorporated herein by reference.

BACKGROUND

1. Field

Apparatuses and methods consistent with exemplary embodiments relate to an image processing apparatus for reading compressed data from a memory via a data bus and an image processing method performed in the image processing apparatus, and more particularly, to an image processing apparatus capable of decompressing only a part of compressed data corresponding to a user input from compressed data stored in a memory and displaying the decompressed data, and an image processing method performed in the image processing apparatus.

2. Description of the Related Art

Image sensors are semiconductor devices that transform light into an electrical signal, and are classified into charge coupled device (CCD) image sensors and complementary metal oxide silicon (CMOS) image sensors. The CCD image sensors operate in a complicated manner, consume significant amount of power, and are manufactured according to a complicated process. Recently, demands for CMOS image sensors have been rapidly increasing in various fields such as digital cameras, camcorders, personal communication systems (PCSs), and game players. Generally, CMOS image sensors include a pixel array, an analog-to-digital converter, a line memory, and a sense amplifier.

The pixel array includes a plurality of pixels arranged in a matrix form, and each of the pixels includes a photo detection element. The analog-to-digital converter converts an analog signal output from the pixel array into a digital signal. The digital signal is temporarily stored in the line memory. The sense amplifier senses and amplifies the digital signal output from the line memory via a bus line.

An operational speed of the CMOS image sensor is directly related with a read-out speed of a digital signal. The read-out speed of the digital signal may depend on a period of time during which a digital signal stored in a line memory is sensed and amplified by a sense amplifier via a bus line and output to the outside. As the period of time decreases, the operational speed of the CMOS image sensor may increase. In mobile devices, image processing that uses a CMOS image sensor becomes important. Accordingly, mobile devices require a method for increasing the operational speed of a CMOS image sensor.

SUMMARY

An exemplary embodiment provides an image processing apparatus capable of decompressing and displaying only a part of compressed data corresponding to a user input from compressed data stored in a memory by allowing random access to the compressed data, and an image processing method performed in the image processing apparatus.

According to an aspect of one or more exemplary embodiments, there is provided an image processing apparatus including a memory; a data bus provided to access the memory; an image conversion unit which receives an image signal and converts the image signal into a frame comprising a plurality of lines; and an image compression/decompression unit which divides the frame into a plurality of line groups, compresses each of the plurality of line groups to generate compressed data, and stores the compressed data in the memory via the data bus, where at least one line in at least one line group from the plurality of line groups is omitted from the compression by the image compression/decompression unit.

According to another aspect of one or more exemplary embodiments, there is provided an image processing method including receiving an image signal, converting the image signal into a frame comprising a plurality of lines; classifying by a processor the plurality of lines of the frame into a plurality of line groups and compressing each of the plurality of line groups to generate compressed data; and storing the compressed data in the memory via a data bus, where at least one line in at least one line group from the plurality of line groups is omitted from the compression.

According to another aspect of one or more exemplary embodiments, there is provided an image processing method including receiving a request to display partial data corresponding to a part of compressed data; determining a line group corresponding to the partial data from a plurality of line groups comprising a plurality of lines included in the compressed data; extracting the determined line group and decompressing the determined line group; and displaying the decompressed line group.

According to another aspect, an image processing apparatus includes a memory that stores a frame of image data and a processor which divides the frame into a plurality of groups and which compresses only a portion of pixels in each group.

According to yet another aspect, an image processing method includes dividing a frame of image data into a plurality of groups, compressing only a portion of pixels in each group, and storing the compressed pixels.

BRIEF DESCRIPTION OF THE DRAWINGS

The above and/or other aspects will become more apparent by describing in detail exemplary embodiments with reference to the attached drawings. The accompanying drawings are intended to depict exemplary embodiments and should not be interpreted to limit the intended scope of the claims. The accompanying drawings are not to be considered as drawn to scale unless explicitly noted.

DETAILED DESCRIPTION OF EXEMPLARY EMBODIMENTS

Detailed exemplary embodiments are disclosed herein. However, specific structural and functional details disclosed herein are merely representative for purposes of describing exemplary embodiments. Exemplary embodiments may, however, be embodied in many alternate forms and should not be construed as limited to only the exemplary embodiments set forth herein.

Accordingly, while exemplary embodiments are capable of various modifications and alternative forms, exemplary embodiments thereof are shown by way of example in the drawings and will herein be described in detail. It should be understood, however, that there is no intent to limit exemplary embodiments to the particular forms disclosed, but to the contrary, exemplary embodiments are to cover all modifications, equivalents, and alternatives falling within the scope of exemplary embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing exemplary embodiments only and is not intended to be limiting of exemplary embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
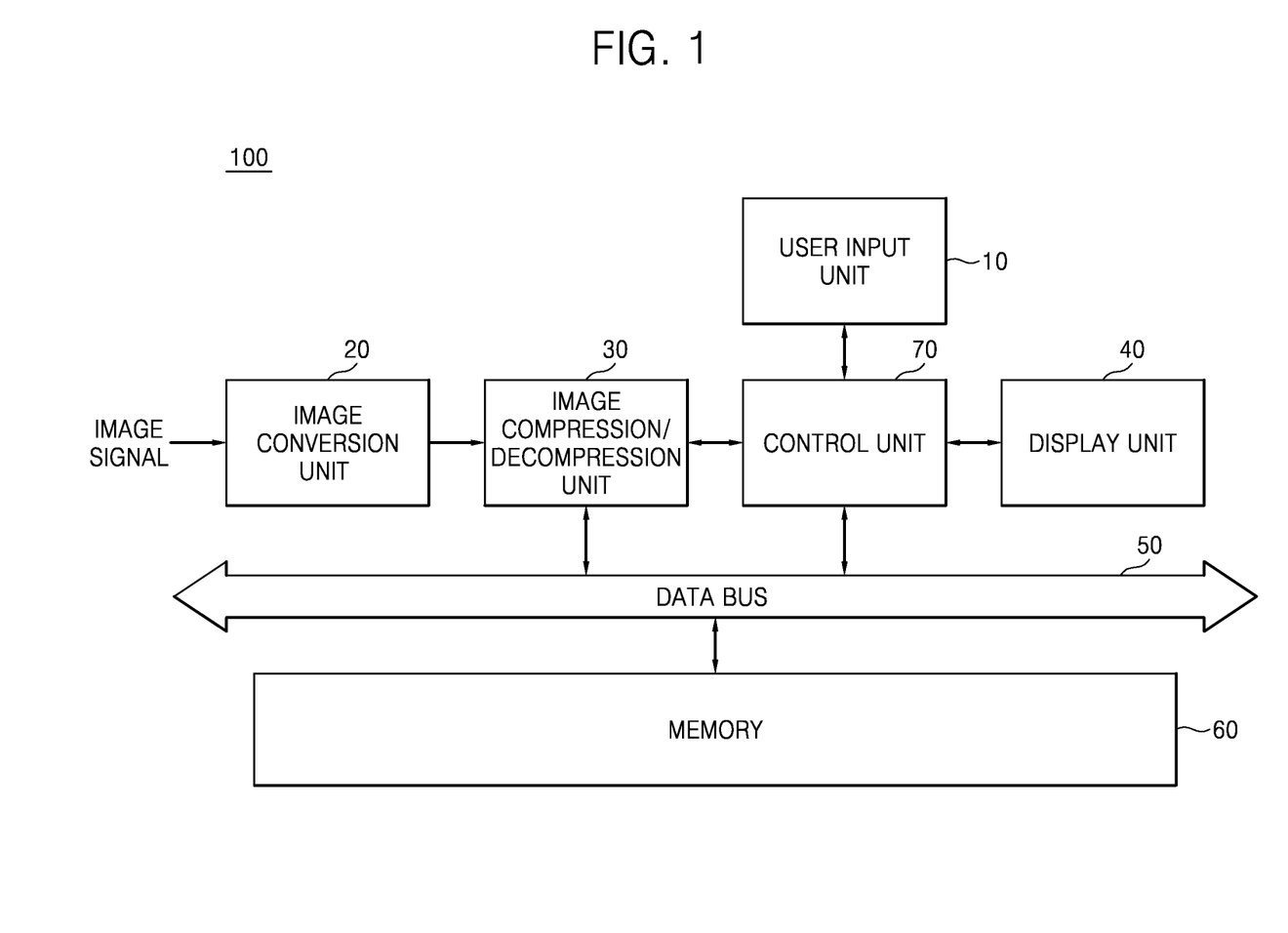
FIG. 1 is a block diagram of a schematic structure of an image processing apparatus according to an exemplary embodiment.

FIG. 1 is a block diagram of a schematic structure of an image processing apparatus 100 according to an exemplary embodiment. Referring to FIG. 1, the image processing apparatus 100 includes a user input unit 10, an image conversion unit 20, an image compression/decompression unit 30, a display unit 40, a data bus 50, a memory 60, and a control unit 70.

The user input unit 10 receives user input, which is input by a user. The user input unit 10 may include at least one button or the like and may receive the user input for receiving an image signal from a user via a camera (not shown) or the like. The user input unit 10 may also receive user input that requests the display unit 40 to display the entire region or a part of an image stored in the memory 60, namely, a frame.

The image conversion unit 20 receives an image signal input from the outside, such as the camera (not shown) or the like, and digitalizes the received image signal into a frame that includes a plurality of lines.

The image compression/decompression unit 30 compresses the frame generated by the image conversion unit 20 to generate compressed data, under the control of the control unit 70. The frame includes the plurality of lines. The image compression/decompression unit 30 first classifies the plurality of lines into a plurality of line groups according to a sequence in which the plurality of lines are arranged in the frame. Thereafter, the image compression/decompression unit 30 compresses each of the plurality of line groups and combines the compressed line groups to generate compressed data.

At this time, the image compression/decompression unit 30 divides each of the plurality of line groups into a first line including only one line and second lines including a plurality of lines. Then, the image compression/decompression unit 30 may perform compression on each of the plurality of line groups by compressing only the second lines of each of the plurality of line groups. In addition, when compressing each of the plurality of line groups under the control of the control unit 70, the image compression/decompression unit 30 may determine the first line to be a line arranged foremost on the frame from the lines included in each of the line groups. The image compression/decompression unit 30 maintains the original state of the first line of each of the plurality of line groups by not decompressing the first line, under the control of the control unit 70.

In other words, the image compression/decompression unit 30 generates the compressed data by compressing only each of the second lines of each of the plurality of line groups that includes 'first line whose original state is maintained' and 'second lines including a plurality of lines to be compressed'.

For example, the lines of the frame generated by the image conversion unit 20 are 20 lines, namely, lines 1 through 20. The image compression/decompression unit 30 groups lines 1 through 6, lines 7 through 12, lines 13 through 18, and lines 19 through 20 to serve as line groups. The image compression/decompression unit 20 classifies each of the line 1, the line 7, the line 13, the line 19, and the line 20 as the first line whose original state is maintained, and classifies lines 2 through 6, lines 8 through 12, and lines 14 through 18 as the second lines.

The image compression/decompression unit 30 compresses the second lines of each line group and then arranges the 20 lines in a sequence of 'line 1→lines 2~6→line 7→lines 8~12→line 13→lines 14~18→line 19→line 20'. As such, the image compression/decompression unit 30 may generate the compressed data by sequentially arranging the first lines in a non-compressed state and the second lines in a compressed state. When the compressed data is generated, the image compression/decompression unit 30 transmits the compressed data to the data bus 50 so that the compressed data is stored in the memory 60.

The image compression/decompression unit 30 decompresses compressed data received from the memory 60 via the memory bus 50. At this time, the image compression/decompression unit 30 does not decompress the entire compressed data corresponding to one frame but may extract and decompress only line groups including a part of the compressed data, namely, partial data, from the memory 60, under the control of the control unit 70, which will be describe later.

At this time, the image compression/decompression unit 30 decompresses the second lines of each of the line groups, based on the first line corresponding to the original data in each of the line groups. Since the second lines are decompressed based on the image quality of the first line corresponding to the original data, the image compression/decompression unit 30 can restore the second lines to almost the original data when decompressing the second lines.

For example, the image quality of the original data is '100'. In case of a compression method in which compressed data does not include original data, the compressed data is typically decompressed based on lines in front of data which is to be decompressed. Accordingly, when the compressed data is decompressed, a result of the decompression is not the exact original data but data with some variation i.e., some data loss. Accordingly, in case of the compression method in which compressed data does not include original data, the quality of image when two lines are decompressed may be '95'. In addition, when two compressed lines are decompressed in both the compression method according to an exemplary embodiment and the compression method in which compressed data does not include the original data, an image is restored with an image quality reduced by '5' from lines on which the data decompression is performed. The lines on which data decompression is performed are hereinafter referred to as base lines.

In the compression method according to an exemplary embodiment, since decompression is performed based on original data, second lines may be restored to an image with an image quality of '95' even though the image quality is reduced by '5'. On the other hand, in the compression method in which compressed data does not include original data, lines may be restored to an image with an image quality of '90' since the image quality of two base lines in front of the lines to be decompressed is '95'. In other words, the image compression/decompression unit 30 according to an exemplary embodiment may restore the compressed second lines of each line group to an image having the image quality close to the original data, by having the first line maintain the original data in each of the line groups.

In the above-illustrated example, the image compression/decompression unit 30 may decompress only lines 1 through 6, lines 7 through 12, or lines 13 through 18 from lines 1 through 20 under the control of the control unit 70.

The display unit 40 may be a flat panel display such as an LCD, an LED, an OLED, or AMOLED, and may display a variety of display data generated in the image processing apparatus 100. If a flat panel display such as an LCD is implemented in a Touch Screen method, the display unit 40 may function as both an input unit and a display unit. The display unit 40 according to an exemplary embodiment displays the image signal input from the outside, such as a camera or the like, or display the frame obtained by the image conversion unit 20. In addition, when the image compression/decompression unit 30 decompresses compressed data, the display unit 40 may display a part or the entire region of a frame obtained by decompressing the compressed data.

The data bus 50 transfers data between the image compression/decompression unit 30 and the memory 60 or between the control unit 70 and the memory 60.

The memory 60 stores a variety of information required to control an operation of the image processing apparatus 100. The memory 60 may be a volatile memory such as a DRAM, or a non-volatile memory such as a flash memory, phase change RAM, or resistive memory. The memory 60 according to an exemplary embodiment stores the frame generated by the image conversion unit 20 or the compressed data generated by the image compression/decompression unit 30. The memory 60 may also previously store a compression rate that is used when the image compression/decompression unit 30 generates the compressed data. The control unit 70 controls the overall operation of the image processing apparatus 100. When the image compression/decompression unit 30 converts the frame into the compressed data, the control unit 70 according to an exemplary embodiment controls the image compression/decompression unit 30 to classify all of the lines included in the frame into the plurality of line groups. At this time, the control unit 70 may determine lines which are not to be compressed, namely, the first lines.

For example, lines 1 through 30 constitute a single frame. The control unit 70 may control the image compression/decompression unit 30 to generate compressed data so that each line group includes 6 lines. At this time, the control unit 70 may determine lines existing at intervals of 6 lines from line 1 to be the first lines that maintain the original data. In this case, the image compression/decompression unit 30 maintains line 1, line 7, line 13, line 19, and line 25 from the lines 1 through 30 at the original state, and compresses the remaining lines 2 through 6, lines 8 through 12, lines 14 through 18, lines 20 through 24, and lines 26 through 30.

When a user input received by the user input unit 10 requests the compressed data stored in the memory 60 to be displayed, the control unit 70 analyzes the received user input. When the user input requests the entire region of a frame to be displayed, the control unit 70 controls the image compression/decompression unit 30 to decompress the entire compressed data.

On the other hand, when the user input requests only a part of the frame to be displayed, the control unit 70 determines from what line to what line of the frame a part corresponding to the user input, that is, partial data, ranges that are to be displayed. At this time, a line from which the partial data starts is referred to as a start line.

The control unit 70 determines a line group including a first line closest to the start line from the compressed data. The control unit 70 also determines whether the line group including the first line is a line group that includes the partial data. If the line group including the first line is the line group that includes the partial data, the control unit 70 controls the image compression/decompression unit 30 to decompress the line group that includes the partial data. Since the first line maintained its original state, the image compression/decompression unit 30 only decompresses the second lines.

In the above-illustrated example, partial data requested by a user is lines 14 through 22 from the entire region of a frame, the start line is line 14. The control unit 70 decompresses a line group that includes line 13, which is a first line i.e., the start line that is closest to line 14. Since lines 13 through 18 are in the same line group, the image compression/decompression unit 30 decompresses lines 14 through 18. Since the partial data corresponds to lines 14 through 22, the control unit 70 extracts not only lines 13 through 18 but also lines 19 through 24 when extracting line groups that include the partial data from the compressed data. Thus, the image compression/decompression unit 30 decompresses not only lines 14 through 18 but also lines 20 through 24. Thus, lines 13 through 24 are all restored to their decompressed state, and the control unit 70 extracts the lines 14 through 22 corresponding to the partial data from the decompressed lines 13 through 24 and displays lines 14 through 22 on the display unit 40.

Instead of decompressing all of lines 20 through 24, the control unit 70 may control the image compression/decompression unit 30 to decompress only lines 20 through 22.

Figure 2:
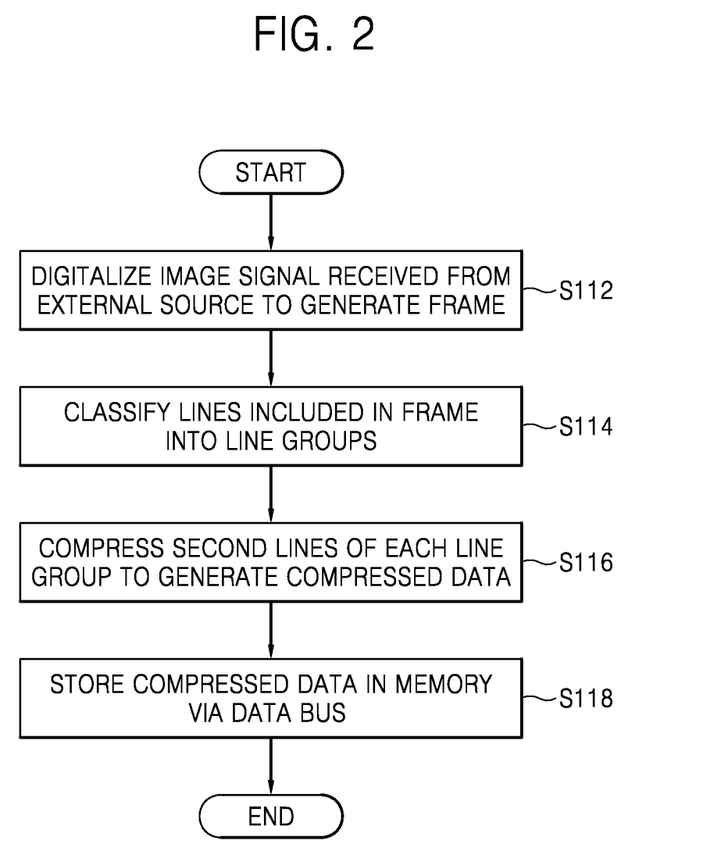
FIG. 2 is a flowchart of an image processing method performed in the image processing apparatus, according to an exemplary embodiment.

FIG. 2 is a flowchart of an image processing method performed in the image processing apparatus, according to an exemplary embodiment. In operation S112, the image conversion unit 10 of the image processing apparatus 100 digitalizes an image signal received from an external source such as a camera (not shown) or the like to generate a frame. In operation S114, the image compression/decompression unit 30 arranges lines included in the frame generated in operation S112 in a sequence from a first line to second lines to classify the lines into a plurality of line groups.

In operation S116, the image compression/decompression unit 30 compresses only the second lines of each line group to generate compressed data. At this time, the control unit 70 may control the image compression/decompression unit 30 to record addresses of lines that maintained their original state without being compressed, namely, the first lines, in the memory 60. When the compressed data is generated by the image compression/decompression unit 30, the control unit 70 stores the compressed data in the memory 60 via the data bus 50, in operation S118.

Figure 3:
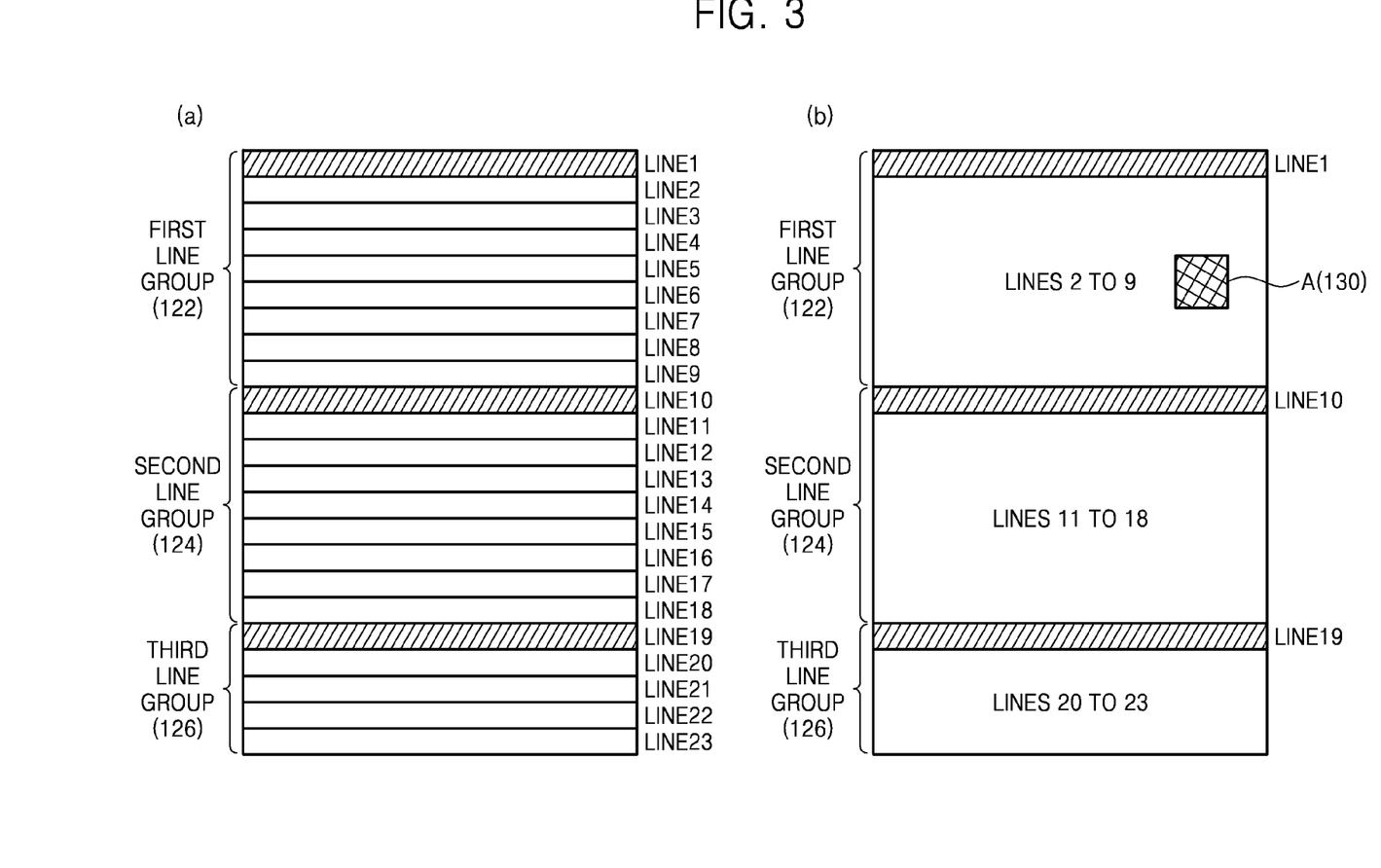
FIG. 3 illustrates a frame and compressed data that are generated by the image processing apparatus according to an exemplary embodiment.

FIG. 3 illustrates a frame and compressed data that are generated by the image processing apparatus 100 according to an exemplary embodiment. FIG. 3 (A) illustrates a frame generated by the image conversion unit 20, and FIG. 3 (B) illustrates compressed data generated by the image compression/decompression unit 30.

Referring to FIG. 3 (A), the compressed data includes lines 1 through 23. Line 1, line 10, and line 19 are respective first lines of first, second, and third line groups 122, 124, and 126. Lines 2 through 9 are the second lines of the first line group 122, lines 11 through 18 are the second lines of the second line group 124, and lines 20 through 23 are the second lines of the third line group 126.

Referring to FIG. 3 (B), the image compression/decompression unit 30 compresses the second lines of the first line group 122, the second lines of the second line group 124, and the second lines of the third line group 126 so that the second lines of each group are transformed into a lump file. The image compression/decompression unit 30 maintains line 1, line 10, and line 19, being the respective first lines of the first, second, and third line groups 122, 124, and 126 in their respective original states, and arranges lines 1 through 23 in a sequence of a first line to second lines, under the control of the control unit 70.

By generating the compressed data as described above, the control unit 70 of the image processing apparatus 100 may easily ascertain what part of the entire frame corresponds to data including the second lines. For example, it is supposed that the partial data requested by the user input unit 10 to be displayed is A(130). Since A(130) is included in the lines 2 through 9 of the first line group 122, the control unit 70 may control the image compression/decompression unit 30 to decompress only lines 2 through 9.

Figure 4:
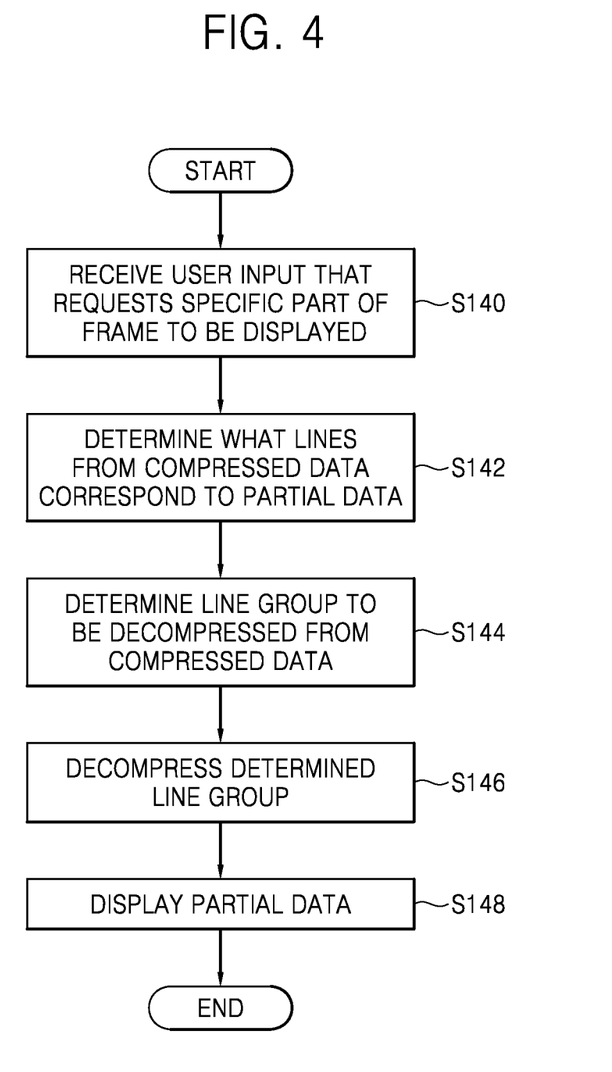
FIG. 4 is a flowchart of an image processing method performed in the image processing apparatus, according to another exemplary embodiment.

FIG. 4 is a flowchart of an image processing method performed in the image processing apparatus 100 according to another exemplary embodiment.

In operation S140, the image processing apparatus 100 receives user input received by the user input unit 10 that requests a specific part of a frame stored in the memory 60 to be displayed on the display unit 40. When the user input is received, the control unit 70 of the image processing apparatus 100 first determines what part of the frame corresponds to the specific part requested by the user input, namely, partial data, in operation S142. At this time, the control unit 70 determines what lines from the lines constituting the frame correspond to the partial data. For example, the control unit 70 may ascertain that the partial data exists between the lines 2 and 9 of the frame as illustrated in FIG. 3 (B).

When the lines corresponding to the partial data are determined, the control unit 70 determines a line group to be decompressed from the compressed data, in operation S144. For example, if the partial data is included in lines 2 through 9, the control unit 70 determines the first line group 122 including lines 2 through 9 to be a line group which is to be decompressed.

When the control unit 70 determines the line group which is to be decompressed, the control unit 70 controls the image compression/decompression unit 30 to decompress line groups starting from a line group including a first line having an address previous to or the same as that of the start line of the partial data from two first lines that are closest to the start line of the partial data. The control unit 70 may also control the image compression/decompression unit 30 to decompress only up to a last line of the requested partial data from all of the lines of the line group to be decompressed. For example, if the partial data ranges only from line 3 to line 7, the image compression/decompression unit 30 may decompress only lines 2 through 7 from the lines included in the first line group 122, under the control of the control unit 70.

The image processing apparatus 100 according to an exemplary embodiment can display a part corresponding to a user input, namely, partial data, to a user without needing to decompress the entire compressed data even when the user input is received as in operation S140. When a line group to be decompressed is determined from the compressed data, the image compression/decompression unit 30 decompresses the determined line group, in operation S146. When the decompression is completed, the display unit 40 displays the partial data, in operation S148.

Figure 5:
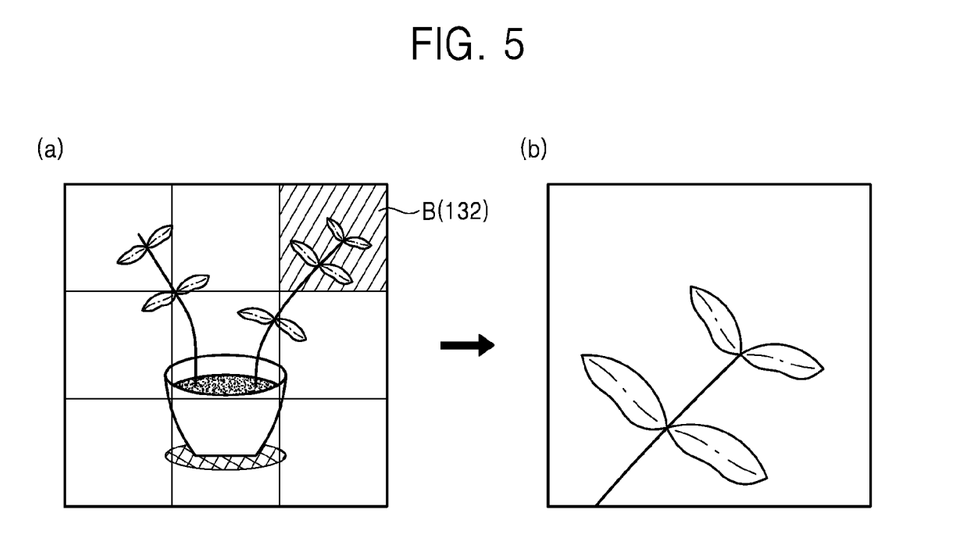
FIG. 5 illustrates a display of partial data in the image processing apparatus according to an exemplary embodiment.

FIG. 5 illustrates display of partial data in the image processing apparatus 100 according to an exemplary embodiment. FIG. 5 (A) illustrates a thumbnail corresponding to a frame, and FIG. 5 (B) illustrates display of partial data.

When dividing a frame into line groups and generating compressed data, the control unit 70 of the image processing apparatus 100 may control the image compression/decompression unit 30 to generate a thumbnail corresponding to each line group. The thumbnail denotes an image obtained by reducing the size of a frame to a predetermined size and compressing the frame with the reduced predetermined size.

Referring to FIG. 5 (A), the image compression/decompression unit 30 divides a frame into 9 line groups and compresses each of the line groups to generate compressed data from each of the line groups. At this time, the control unit 70 controls the image compression/decompression unit 30 to designate the first line of each of the nine line groups as a first line so that the first line is maintained in its original state. When the image processing apparatus 100 stores compressed data in the memory 60 via the data bus 50, the image processing apparatus 100 divides a thumbnail corresponding to the compressed data according to groups as shown in FIG. 5 (A) so that a thumbnail corresponds to each line group.

For example, a thumbnail as shown in FIG. 5 (A) is displayed on the display unit 40 and a user input designates a selection of partial data B(132). The image processing apparatus 100 can display B(132) on the display unit 40 as shown in FIG. 5 (B) by reading only a line group corresponding to B(132) from compressed data stored in the memory 60 and decompressing only the read-out line group.

In an image processing apparatus and an image processing method of processing compressed data read from a memory via a data bus, the compressed data can be randomly accessed, so that only partial data corresponding to a user input from the compressed data stored in the memory may be decompressed and displayed.

Exemplary embodiments having thus been described, it will be obvious that the same may be varied in many ways. Such variations are not to be regarded as a departure from the intended spirit and scope of exemplary embodiments, and all such modifications as would be obvious to one skilled in the art are intended to be included within the scope of the following claims and their equivalents.

What is claimed is:

1. An image processing apparatus comprising:
   a memory;
   a data bus which provides access to the memory;
   an image conversion unit which receives an image signal and converts the image signal into a frame comprising a plurality of lines; and
   an image compression/decompression unit which divides the frame into a plurality of line groups, compresses each of the plurality of line groups to generate compressed data, and stores the compressed data in the memory via the data bus,
   wherein at least one line in at least one line group from the plurality of line groups is omitted from the compression by the image compression/decompression unit,
   wherein each of the plurality of line groups comprises one first line that maintains an original uncompressed state, and a plurality of second lines that are compressed at a predetermined compression rate by the image compression/decompression unit,
   wherein the first line is arranged before the second lines in the frame, and
   wherein the first line maintains the original uncompressed state regardless of the complexity of the first line.

2. The image processing apparatus of claim 1, further comprising a control unit which controls the image compression/decompression unit to determine a line group corresponding to a part of the compressed data and decompress the determined line group, when a display request for displaying partial data that corresponds to the part of the compressed data is received.

3. The image processing apparatus of claim 1, further comprising:
   a user input unit which receives from a user a request to display partial data corresponding to a part of the frame; and
   a display unit which displays the partial data.

4. The image processing apparatus of claim 2, wherein the control unit compares an address of the first line maintained in the original uncompressed state in each of the plurality of line groups included in the compressed data with an address of a first line in the partial data, and determines a line group including a first line having an address closest to an address of the first line in the partial data to be the line group corresponding to the partial data.

5. The image processing apparatus of claim 2, wherein when the line group corresponding to the partial data is determined, the control unit controls the image compression/decompression unit to decompress a line group comprising the compressed lines in the determined line group to a line having a same address as an address of a last line in the partial data.

6. The image processing apparatus of claim 1, wherein the second lines are compressed regardless of the complexity of the second lines.

7. An image processing method comprising:
   receiving an image signal;
   converting the image signal into a frame comprising a plurality of lines;
   classifying by a processor the plurality of lines of the frame into a plurality of line groups and compressing each of the plurality of line groups to generate compressed data; and
   storing the compressed data,
   wherein at least one line in at least one line group from the plurality of line groups is omitted from the compression,
   wherein each of the plurality of line groups comprises one first line that maintains an original uncompressed state, and a plurality of second lines that are compressed at a predetermined compression rate,
   wherein the first line is arranged before the second lines in the frame, and
   wherein the first line maintains the original uncompressed state regardless of the complexity of the first line.

8. The image processing method of claim 7, further comprising:
   receiving from a user a request to display partial data corresponding to a part of the frame;
   determining a line group corresponding to the partial data from the compressed data and decompressing the determined line group; and
   displaying the decompressed line group.

9. An image processing method comprising:
   receiving a request to display partial data corresponding to a part of compressed data;
   determining a line group corresponding to the partial data from a plurality of line groups comprising a plurality of lines included in the compressed data;
   extracting the determined line group and decompressing the determined line group; and
   displaying the decompressed line group,
   wherein each of the plurality of line groups comprises one first line that maintains an original uncompressed state, and a plurality of second lines that are compressed at a predetermined compression rate,
   wherein the first line is arranged before the second lines in a frame corresponding to the compressed data, and
   wherein the first line maintains the original uncompressed state regardless of the complexity of the first line.

10. The image processing method of claim 9, wherein the determining of the line group comprises comparing an address of the first line that is maintained in the original uncompressed state in each of the plurality of line groups included in the compressed data with an address of a first line included in the partial data, and determining a line group comprising a first line having an address closest to an address of the first line in the partial data to be the line group corresponding to the partial data.

11. The image processing method of claim 9, wherein the decompressing of the determined line group comprises, when the line group corresponding to the partial data is determined, decompressing compressed lines in a line group up to a line having a same address as an address of a last line of the partial data.

12. An image processing apparatus comprising:
   a memory that stores a frame of image data; and
   a processor which divides the frame into a plurality of groups and which compresses only a portion of pixels in each group, wherein the processor divides each of the groups into a plurality of lines and omits at least one line in each group from the compression, wherein the at least one line in said each group is maintained in an original uncompressed state, wherein the at least one line in each group from the compression is arranged before a remaining plurality of lines, and wherein the first line maintains the original uncompressed state regardless of the complexity of the first line.

13. The image processing apparatus of claim 12, wherein the processor decompresses compressed lines in a group by referring to the at least one line that was omitted from the compression.

14. An image processing method comprising:

dividing a frame of image data into a plurality of groups;

compressing only a portion of pixels in each group; and storing the compressed pixels, wherein one of the plurality of groups is divided into a plurality of lines such that at least one line in the one group is omitted from the compression and wherein the at least one line is maintained in an original uncompressed state, wherein the compressed portion of pixels in each group are decompressed based on the at least one line maintained in the original state, wherein the at least one line in the one group is arranged before a remaining plurality of lines, and wherein the first line maintains the original uncompressed state regardless of the complexity of the first line.

* * * * *